United States Patent
Dudziak et al.

(10) Patent No.: US 9,452,490 B2
(45) Date of Patent: Sep. 27, 2016

(54) METHOD FOR CONNECTING DIFFERENT TYPES OF METALLIC JOINING PARTNERS USING A RADIATION SOURCE

(71) Applicant: Robert Bosch GmbH, Stuttgart (DE)

(72) Inventors: Sonja Dudziak, Bietigheim-Bissingen (DE); Reiner Ramsayer, Rutesheim (DE); Christoph Bantel, Ditzingen (DE); Eugen Hilz, Schwieberdingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/081,584

(22) Filed: Nov. 15, 2013

(65) Prior Publication Data

US 2014/0144890 A1    May 29, 2014

(30) Foreign Application Priority Data

Nov. 27, 2012  (DE) .................... 10 2012 221 617

(51) Int. Cl.
    *B23K 15/00* (2006.01)

(52) U.S. Cl.
    CPC .......... *B23K 15/0093* (2013.01); *B23K 26/323* (2015.10); *B23K 2203/10* (2013.01); *B23K 2203/12* (2013.01)

(58) Field of Classification Search
    CPC .......... B23K 15/0093; B23K 2203/12; B23K 2203/10; B23K 26/3233; B23K 26/32; B23K 2201/34
    See application file for complete search history.

(56) References Cited

U.S. PATENT DOCUMENTS

| | | | | |
|---|---|---|---|---|
| 2,987,610 | A * | 6/1961 | Steigerwald | 219/121.13 |
| 3,794,807 | A * | 2/1974 | Bailey et al. | 219/121.14 |
| 3,975,612 | A * | 8/1976 | Nakazaki et al. | 219/121.14 |
| 4,224,499 | A * | 9/1980 | Jones | 219/121.85 |
| 4,281,235 | A * | 7/1981 | Peloquin | 219/121.14 |
| 4,574,176 | A * | 3/1986 | Sharp | 219/121.64 |
| 4,684,781 | A * | 8/1987 | Frish et al. | 219/121.78 |
| 4,695,699 | A * | 9/1987 | Yagii et al. | 219/121.64 |
| 4,752,669 | A * | 6/1988 | Sharp et al. | 219/121.67 |
| 5,250,783 | A * | 10/1993 | Nishi et al. | 219/121.64 |
| 5,370,925 | A * | 12/1994 | Koseki | 428/36.1 |
| 5,393,956 | A * | 2/1995 | Guth et al. | 219/121.64 |
| 5,591,359 | A * | 1/1997 | Saitou et al. | 219/121.64 |
| 5,591,360 | A * | 1/1997 | Mombo-Caristan | 219/121.64 |
| 5,595,670 | A * | 1/1997 | Mombo-Caristan | 219/121.64 |
| 5,603,853 | A * | 2/1997 | Mombo-Caristan | 219/121.64 |
| 6,300,591 | B1 * | 10/2001 | Fuerschbach et al. | 219/121.64 |

(Continued)

FOREIGN PATENT DOCUMENTS

| | | |
|---|---|---|
| DE | 10 2004 009651 | 9/2005 |
| DE | 103 59 564 | 7/2009 |
| WO | WO 2012125515 A1 * | 9/2012 |

*Primary Examiner* — Dana Ross
*Assistant Examiner* — Renee L Larose
(74) *Attorney, Agent, or Firm* — Norton Rose Fulbright US LLP

(57) ABSTRACT

A method for connecting different types of metallic joining partners using a radiation source, the two joining partners, having a different melting temperature, at least indirectly making contact lying against each other in the region of a joining zone, and the radiation source introducing its radiation energy into the one joining partner in a region next to the joining zone. It is provided that, because of the radiation source in the joining zone only the joining partner having a lower melting temperature is melted.

18 Claims, 2 Drawing Sheets

(56) References Cited

U.S. PATENT DOCUMENTS

| | | | |
|---|---|---|---|
| 6,844,522 B1* | 1/2005 | Wang et al. | 219/121.64 |
| 6,914,213 B2* | 7/2005 | Alips et al. | 219/121.64 |
| 7,592,566 B2* | 9/2009 | Maura et al. | 219/121.64 |
| 7,705,265 B2* | 4/2010 | Asakura et al. | 219/121.64 |
| 2002/0148880 A1* | 10/2002 | Brink | 228/194 |
| 2004/0084509 A1* | 5/2004 | Meyer et al. | 228/194 |
| 2004/0200813 A1* | 10/2004 | Alips et al. | 219/121.63 |
| 2006/0000812 A1* | 1/2006 | Weber et al. | 219/121.61 |
| 2006/0006157 A1* | 1/2006 | Oldani | 219/121.64 |
| 2006/0108334 A1* | 5/2006 | Frietsch et al. | 219/121.64 |
| 2007/0160868 A1* | 7/2007 | Watanabe et al. | 428/675 |
| 2007/0164004 A1* | 7/2007 | Matsuda et al. | 219/121.61 |
| 2007/0210042 A1* | 9/2007 | Forrest et al. | 219/121.64 |
| 2008/0017696 A1* | 1/2008 | Urech et al. | 228/256 |
| 2008/0102308 A1* | 5/2008 | Doira et al. | 428/653 |
| 2008/0193675 A1* | 8/2008 | Wu et al. | 427/580 |
| 2008/0251504 A1* | 10/2008 | Lu et al. | 219/121.64 |
| 2010/0089977 A1* | 4/2010 | Chen et al. | 228/114.5 |
| 2010/0118899 A1* | 5/2010 | Peng et al. | 372/25 |
| 2010/0215983 A1* | 8/2010 | Patel et al. | 428/679 |
| 2011/0206943 A1* | 8/2011 | Willis et al. | 428/609 |
| 2012/0074106 A1* | 3/2012 | Canourgues et al. | 219/121.64 |

\* cited by examiner

METHOD FOR CONNECTING DIFFERENT TYPES OF METALLIC JOINING PARTNERS USING A RADIATION SOURCE

RELATED APPLICATION INFORMATION

The present application claims priority to and the benefit of German patent application No. 10 2012 221 617.0, which was filed in Germany on Nov. 27, 2012, the disclosure of which is incorporated herein by reference.

FIELD OF THE INVENTION

The present invention relates to a method for connecting different types of metallic joining partners using a radiation source.

BACKGROUND INFORMATION

A method of this type is discussed in German patent document DE 10 2004 009 651 A1. In this method, which especially may be used for welding together aluminum and copper, a laser beam having a lateral offset of a few tenths of a millimeter to a joining zone is inserted into the aluminum that has a lower melting temperature. In such a welding offset in the direction towards the aluminum, the copper is melted only partially directly by the laser beam but also indirectly by the aluminum melt. In the method, relatively high strength factors are able to be achieved, in spite of the use of different types of metals. The problem in this context is particularly the appearance of the so-called intermetallic phase in the joining zone by the mixing of the two liquified materials in the molten state. Such an intermetallic phase is characterized by hard and brittle regions, which lead to a decrease in the strength factors. Nevertheless, even in the known method, in the region of the joining zone, a complete melting of the aluminum takes place as well as at least a partial melting of the copper.

In addition, in DE 103 59 564 A1, of this Applicant, in the connecting region of two components, having a different melting temperature, by melting the component having a lower melting temperature and a corresponding forming of the two components after the hardening of the melt, one may develop a form-locking connection in which the one component having the lower melting temperature forms a sort of rivet, for example, which encompasses a recess in the component having the higher melting temperature with form locking.

SUMMARY OF THE INVENTION

Starting from the related art shown, the present invention is based on the object of further developing a method for connecting different types of metallic joining partners using a radiation source according to the description herein in such a way that the formation of the intermetallic phase mentioned is at least essentially prevented. This object is attained, according to the present invention, by a method having the features described herein, in that the radiation energy exclusively has the effect of melting the joining partner having the lower melting temperature. This means, in other words, that by the selection of corresponding parameters (radiation power, distance of applying the radiation energy to the joining zone, duration of irradiation, etc.) the melting in the joining zone of the joining partner having the higher melting temperature is prevented. Because the melting of the joining partner having a higher melting temperature in the joining zone is prevented, no intermetallic phase is able to be created, in which components of the liquified joining partner combine with one another.

Advantageous refinements of the method according to the present invention for the combination of different types of metallic joining partners are given in the dependent claims.

In contrast to the approach from DE 10 2004 009 651 A1, it is provided in one embodiment of the present method that the application of the radiation energy takes place into the joining partner having the higher melting temperature. When copper and aluminum are used as joining partners, this means that the radiation energy is applied to the copper. In the process, (for example, the aluminum) of the joining partners melts having the lower melting temperature and enters into a combination with the surface of the joining partner (e.g. the copper) that has the higher melting temperature. By an appropriate selection parameters addressed above, it particularly may be provided, in this context, that joining partner having the higher melting temperature, that is, copper, is only melted in the immediate surroundings of the entry plane of the radiation source, but not in the region of the joining zone, i.e. in the transition region of the two joining partners.

The method according to the present invention described is basically suitable for joining different types of materials, which also have a relatively large difference in their melting temperature. In order to influence, or rather to improve the quality of the joining connection between the two joining partners, it may be provided in one further embodiment of the invention that one of the two joining partners be provided ahead of time with a coating in the joining zone.

In a first variant of such a coating, it is provided that the coating be applied on the joining partner having the higher melting temperature, and that the melting temperature of the coating be higher than the melting temperatures of the two joining partners. The coating, or rather the material of the coating should in this case may have better binding properties to the two joining partners than the two joining partners have for each other, and thereby a better connection is enabled. The material of the coating is particularly selected so that it enters into an advantageous connection with the joining partner having the lower melting temperature, and that it is able to be applied onto the joining partner having the higher melting temperature in a simple and advantageous manner.

In one alternative embodiment of the coating, it may also be provided that the coating be applied to the joining partner having the lower melting temperature, and that the melting temperature of the coating is lower than the melting temperatures of the two joining partners. In such an embodiment of the coating, it is possible that particularly the material of the coating is melted and that the connection between the components takes place only because of the coating.

In a further alternative embodiment of the present invention, it is provided that the two joining partners be provided with a coating in the joining zone, and that a first coating is applied to the joining partner having the lower melting temperature, than the two joining partners and the second coating. In this case, the material of the first coating is first melted and then combines with the material having the lower melting temperature and its coating. In this case, the coating that has been applied to the joining partner having the lower melting temperature, makes possible a compensation for the lacking binding properties of the coating having a higher melting temperature and of the joining partner having a higher melting temperature.

It is particularly advantageous, during the application of such coatings, if the at least one coating lies outside the region at which the radiation source introduces the radiation energy into the joining partner.

Thereby, for example, one is able to avoid heat transmission from the location of the introduction of the radiation energy into the joining zone via the heat conduction of the coating.

The method according to the present invention may be used in response to joining partners made of aluminum and plastic or their alloys. Such materials are used particularly in the field of electrical technology or electronics for conducting elements used for current conduction.

The method may be used particularly simply and accurately for components or joining partners when these are laid side-by-side. In particular, one is thereby able to produce a melting zone reaching over nearly the entire height and thickness of the one joining partner at the location of the introduction of the radiation energy into the joining partner, so that the heat energy is also passed on over nearly the entire height and thickness of the one joining partner into the joining zone, in the direction towards the other joining partner. Nevertheless, applications are naturally also conceivable in which the components overlap with each other. A further effect of the heat transmission between the two joining partners may be achieved in that the radiation source, or laser beam, if that is what is used, is locally positioned in superposition to its regular feed motion (local beam chopping).

In order to achieve a homogeneously uniform heating of the joining partner having a lower melting temperature in the joining zone, it has proven advantageous if the distance of the range of introducing the radiation energy into the joining partner (beam offset) corresponds to 0.5 to 5 times the thickness of the joining partners.

Additional advantages, features and details of the present invention derive from the following description of the exemplary embodiments as well as from the figures.

DETAILED DESCRIPTION

Figure 1:
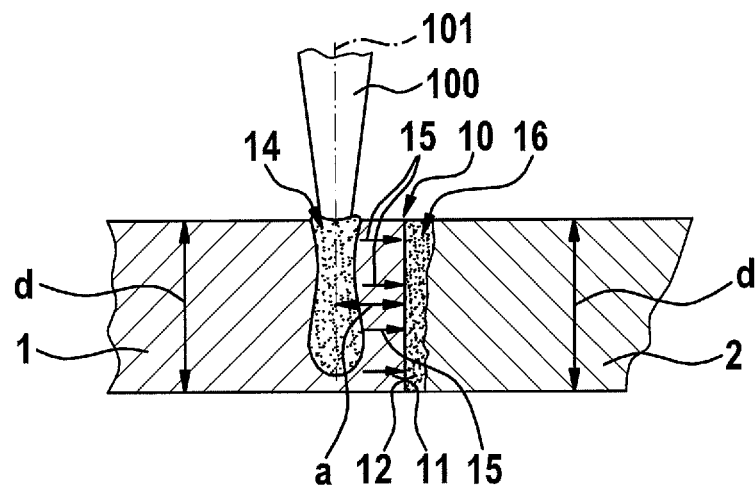
FIG. 1 shows a section in the region of two joining partners that are to be welded to each other, in which they are directly connected to each other by making contact lying against each other.

The same elements and elements having the same function are provided with the same reference numerals in the figures.

In FIG. 1 a section through two joining partners 1, 2 is shown, which in the region of a joining zone 10 are connected or rather joined. The two joining partners 1, 2 are metallic joining partners 1, 2, which have a different melting temperature. In particular, the one joining partner 1 may be made of copper, perhaps having alloy components; and the other joining partner may be made of aluminum, perhaps also having alloy components. The two joining partners 1, 2 are distinguished, as was mentioned, by melting temperatures of a different magnitude, joining partner 1 having a higher melting temperature than joining partner 2.

In the region of joining zone 10 and in the close range about joining zone 10, the two joining partners 1, 2 are each developed to be rectangular in cross section and lie directly against each other with their two facing end faces 11, 12 by making contact lying against each other, the thickness d of the two joining partners 1, 2 being of the same size in the region of joining zone 10.

Into the upper side of joining partner 1, using a radiation source that is not shown, for instance, a laser radiation source or an electron beam source, a beam 100 having a radiation axis 101 is applied, radiation axis 101, in the exemplary embodiment, running perpendicular to the surface of the two joining partners 1, 2 or parallel to end faces 11, 12 of joining partners 1, 2. With reference to end face 11 of joining partner 1, radiation axis 101 has a lateral offset, or a distance a, which in particular amounts to 0.5 to 5 times thickness d. Beam 100 and joining partners 1, 2 are moved relatively to one another in a plane that is perpendicular to the plane of the drawing of FIG. 1.

By a corresponding selection of the parameters of the radiation source (power, acting duration, feed speed, etc.) the material of the one joining partner 1 is melted in a relatively narrow melting zone 14, melting zone 14 may reach as far as close to the lower side of joining partner 1. As may be seen with the aid of the illustration of FIG. 1, melting zone 14 has a relatively high aspect ratio, i.e. the depth of melting zone 14 is substantially greater than its width. Because of the melting of the material of joining partner 1 in melting zone 14, a heat flow, that is, a heat transmission from joining partner 1 takes place in the direction towards joining partner 2. This heat transmission is shown by arrows 15. What is essential in this context is that melting zone 14 does not reach all the way to end face 11 of joining partner 1, which means that joining partner 1 in the vicinity of its end face 11 is not, or at least is predominantly not melted. Because of the transition of the thermal (energy) from joining Partner 1 to joining partner 2 in the region of end faces 11, 12, however, melting of joining partner 2, having a lower melting temperature, takes place in a melting region 16, which runs, for instance, over the entire thickness and height of joining partner 2. In this region, the melted material of joining partner 2 connects to the (not) melted material of joining partner 1 and adheres to it as soon as no radiation energy is applied to joining partner 1 and the material of joining partners 1, 2 has cooled off, or rather, solidified.

Figure 2:
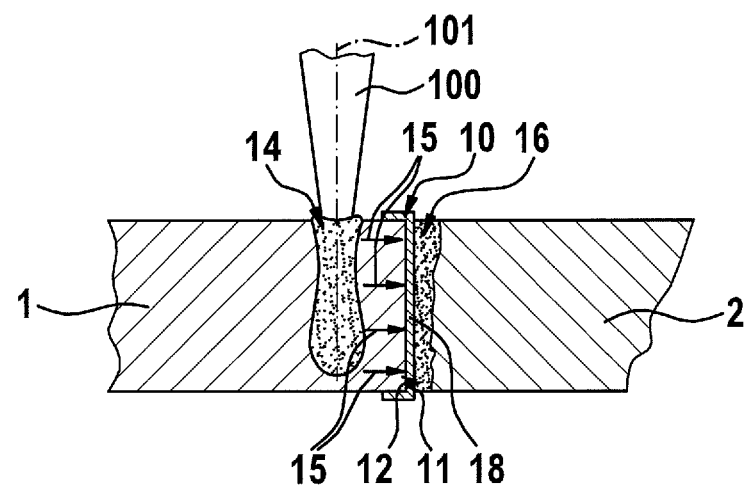
FIG. 2 shows a section according to FIG. 1, in which a coating has been applied to the joining partner having the higher melting temperature.

FIG. 2 shows an exemplary embodiment that is modified from that shown in FIG. 1, in which a first coating 18 has been applied that is U-shaped in cross section. In particular, the application of first coating 18 takes place, at least essentially, only in the vicinity of end face 11. In any case, first coating 18 does not reach as far as the range of beam 100. First coating 18 has a higher melting temperature than the two joining partners 1, 2. In addition, first coating 18 has better binding properties to the two joining partners 1, 2 that the two joining partners 1, 2 have to each other. By an appropriate selection of the material of first coating 18, it is additionally ensured that the material of first coating 18 makes an advantageous connection with joining partner 2, and is further able to be applied simply and favorably, from a standpoint of production engineering, onto first joining partner 1.

Figure 3:
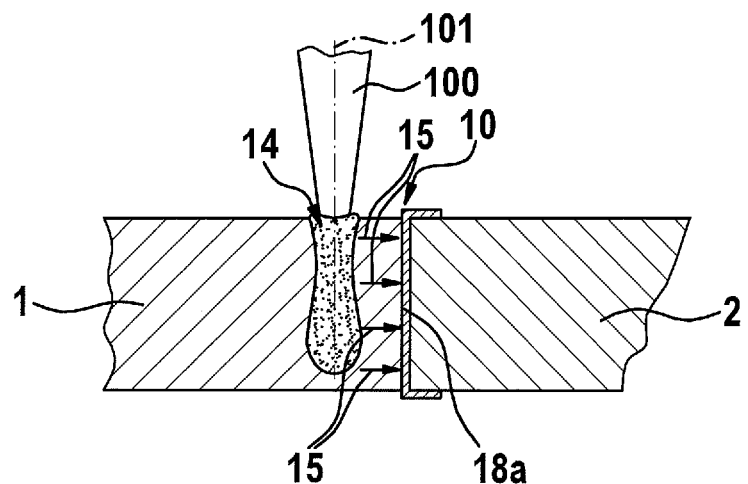
FIG. 3 shows a section through the two joining partners according to FIG. 1, in which a coating has been applied to the joining partner having a lower melting temperature.

The system shown in FIG. 3 differs from the system according to FIG. 2 in that first coating 18a has been applied onto joining partner 2 having the lower melting temperature, in the exemplary embodiment also U-shaped in cross section, first coating 18a running over the entire height of end face 12 of joining partner 2. The material of first coating 18a has a melting temperature which is not lower than the melting temperature of the two joining partners 1, 2. By the heat input via beam 100 it is consequently possible, if necessary, to melt only first coating 18a.

Figure 4:
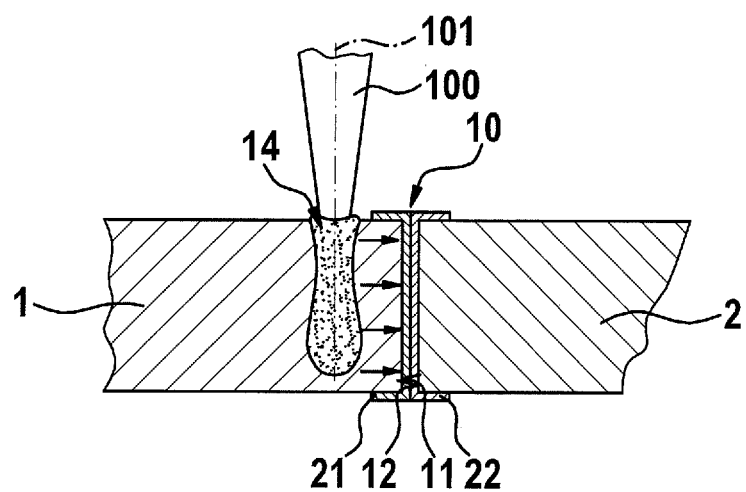
FIG. 4 shows a section through the two joining partners according to FIG. 1, in which a coating has been applied to both joining partners in the region of the joining zone.

Finally, in FIG. 4, a system is shown in which both joining partners 1, 2 are provided with coatings 21, 22 in the region of their end faces 11, 12. In this context, coating 21, which is applied to joining partner 1, has the highest melting temperature, while coating 22 on joining partner 2 has the smallest melting temperature. By analogy to the exemplary embodiment shown in FIG. 3, there consequently first takes place the melting of coating 22. The material of second coating 22 then enters into a connection with second joining partner 2 and coating 21 of first joining partner 1. Coating 21 on first joining partner 1 makes possible a compensation for lacking binding properties of coating 22 and of first joining partner 1.

The method described up to this point may be altered and modified in multiple ways without deviating from the idea of the present invention. In particular, other arrangements of joining partners 1, 2 and coatings 18 18a, 21 and 22 are also conceivable.

What is claimed is:

1. A method for connecting different types of metallic joining partners using a radiation source, the method comprising:
   providing that joining partners, having a different melting temperature, at least indirectly make contact lying against each other in a region of a joining zone; and
   introducing radiation energy of the radiation source into one of the joining partners in a region next to the joining zone;
   wherein:
      the joining partner into which the radiation energy is introduced has a higher melting temperature than the other of the joining partners;
      because of the radiation source in the joining zone, only the other of the joining partners is melted;
      a melting zone having a relatively high aspect ratio, so that a depth of the melting zone is substantially greater than its width, is created by the radiation source which is applied to the joining partner having the higher melting temperature, and
      the melting of the material of the joining partner, having the higher melting temperature, in the melting zone results in a heat transmission from the joining partner in the melting zone in a direction towards the joining partner having the lower melting temperature.

2. The method of claim 1, wherein one of the two joining partners is provided with a coating in the joining zone.

3. The method of claim 2, wherein a coating is applied onto the joining partner having the higher melting temperature, and wherein a melting temperature of the coating is higher than melting temperatures of the two joining partners.

4. The method of claim 2, wherein the coating is applied onto the joining partner having the lower melting temperature, and wherein a melting temperature of the coating is lower than melting temperatures of the two joining partners.

5. The method of claim 1, wherein both of the joining partners are provided with a coating in the joining zone, and wherein the joining partner having the lower melting temperature has a coating applied to it that has a lower melting temperature than the two joining partners and the other coating.

6. The method of claim 2, wherein the at least one coating lies outside the region at which the radiation source introduces the radiation energy into the joining partner.

7. The method of claim 1, wherein aluminum and copper or alloys with aluminum and copper as a main component are used as joining partners.

8. The method of claim 1, wherein the two joining partners are positioned to make contact lying against each other with their end faces lying opposite each other.

9. The method of claim 1, wherein a distance of the region of introducing the radiation energy into the joining partner corresponds to 0.5 times to 5 times the thickness of the joining partner.

10. A method for connecting different types of metallic joining partners using a radiation source, the method comprising:
   providing a first joining partner and a second joining partner in at least indirect contact with each other in a joining zone, wherein the second joining partner has a higher melting temperature than the first joining partner; and
   melting the first joining partner in the joining zone, without melting the second joining partner in the joining zone by introducing radiation energy of the radiation source into the second joining partner in a region near the joining zone;
   wherein a melting zone having a relatively high aspect ratio, so that a depth of the melting zone is substantially greater than its width, is created by the radiation source which is applied to the joining partner having the higher melting temperature, and
   wherein the melting of the material of the joining partner, having the higher melting temperature, in the melting zone results in a heat transmission from the joining partner in the melting zone in a direction towards the joining partner having the lower melting temperature.

11. The method of claim 10, wherein one of the two joining partners is provided with a coating in the joining zone.

12. The method of claim 11, wherein a coating is applied onto the joining partner having the higher melting temperature, and wherein a melting temperature of the coating is higher than melting temperatures of the two joining partners.

13. The method of claim 11, wherein the coating is applied onto the joining partner having the lower melting temperature, and wherein a melting temperature of the coating is lower than melting temperatures of the two joining partners.

14. The method of claim 10, wherein both of the joining partners are provided with a coating in the joining zone, and wherein the joining partner having the lower melting temperature has a coating applied to it that has a lower melting temperature than the two joining partners and the other coating.

15. The method of claim 11, wherein the at least one coating lies outside the region at which the radiation source introduces the radiation energy into the joining partner.

16. The method of claim 10, wherein aluminum and copper or alloys with aluminum and copper as a main component are used as joining partners.

17. The method of claim 10, wherein the two joining partners are positioned to make contact lying against each other with their end faces lying opposite each other.

18. The method of claim 10, wherein a distance of the region of introducing the radiation energy into the joining partner corresponds to 0.5 times to 5 times the thickness of the joining partner.

* * * * *